United States Patent [19]

Canright

[11] 4,070,958
[45] Jan. 31, 1978

[54] MEAT SMOKING AND MERCHANDISE DISPLAY CASE

[76] Inventor: Bruce W. Canright, 204 Gardenview, San Antonio, Tex. 78213

[21] Appl. No.: 664,558

[22] Filed: Mar. 8, 1976

Related U.S. Application Data

[63] Continuation-in-part of Ser. No. 506,991, Sept. 18, 1974, Pat. No. 3,942,425.

[51] Int. Cl.² .................. A01J 11/00; A23B 4/04
[52] U.S. Cl. ........................................ 99/468; 99/482
[58] Field of Search .................... 99/467–468, 99/474, 479, 482, 473; 21/109–110; 43/127–128; 34/51

[56] References Cited

U.S. PATENT DOCUMENTS 2,576,925  12/1951  Dillon ................................ 99/468
3,901,136  8/1975  Wilson ............................... 99/479
3,961,571  6/1976  Decuir ............................... 99/474

Primary Examiner—Harvey C. Hornsby
Assistant Examiner—Robert Pous
Attorney, Agent, or Firm—John C. Stahl

[57] ABSTRACT

A meat smoking and merchandise display case comprising an outer casing, a vertically extending and rotatably driven cylinder mounted in said outer casing and to which food products are adapted to be secured, smoke producing means in said case adapted to be activated by heating means, temperature control means adapted to deactivate said heating means at a predetermined temperature, smoke control means adapted to measure the density of smoke within said case and deactivate said heating means when the smoke exceeds a desired density, and means to selectively evacuate the smoke from said case.

9 Claims, 5 Drawing Figures

MEAT SMOKING AND MERCHANDISE DISPLAY CASE

REFERENCE TO RELATED APPLICATION

This application is a continuation-in-part of applicant's copending application Ser. No. 506,991, filed on Sept. 18, 1974, now U.S. Pat. No. 3,942,425.

BACKGROUND OF THE INVENTION

Heretofore it has been the general practice to construct smoke houses, smoking towers and boxes in any desired shape with a solid, insulated outer casing; the products undergoing smoking are normally suspended from the ceiling of said casing. In general, no effort has been made in such prior art devices to control the temperature or density of smoke and deactivate the smoke producing means if the temperature or density of smoke exceeds desired limits.

SUMMARY OF THE INVENTION

It is therefore the primary object of the invention to provide a meat smoking and merchandise display case wherein the food products undergoing processing are visible at all times and after processing the said food products are advantageously displayed to propspective user of said products or customer.

Another object is to provide such a device wherein the smoking process is conducted under desired conditions of temperature and smoke density and said device may be used by all establishements that sell or serve smoked food products to customers.

Still another object is to provide such a device which may easily be cleaned and maintained in sanitary condition.

A final object is to provide such a smoking device which is simple in design, inexpensive to manufacture, easy to use, and efficient in operation.

Figure 1:
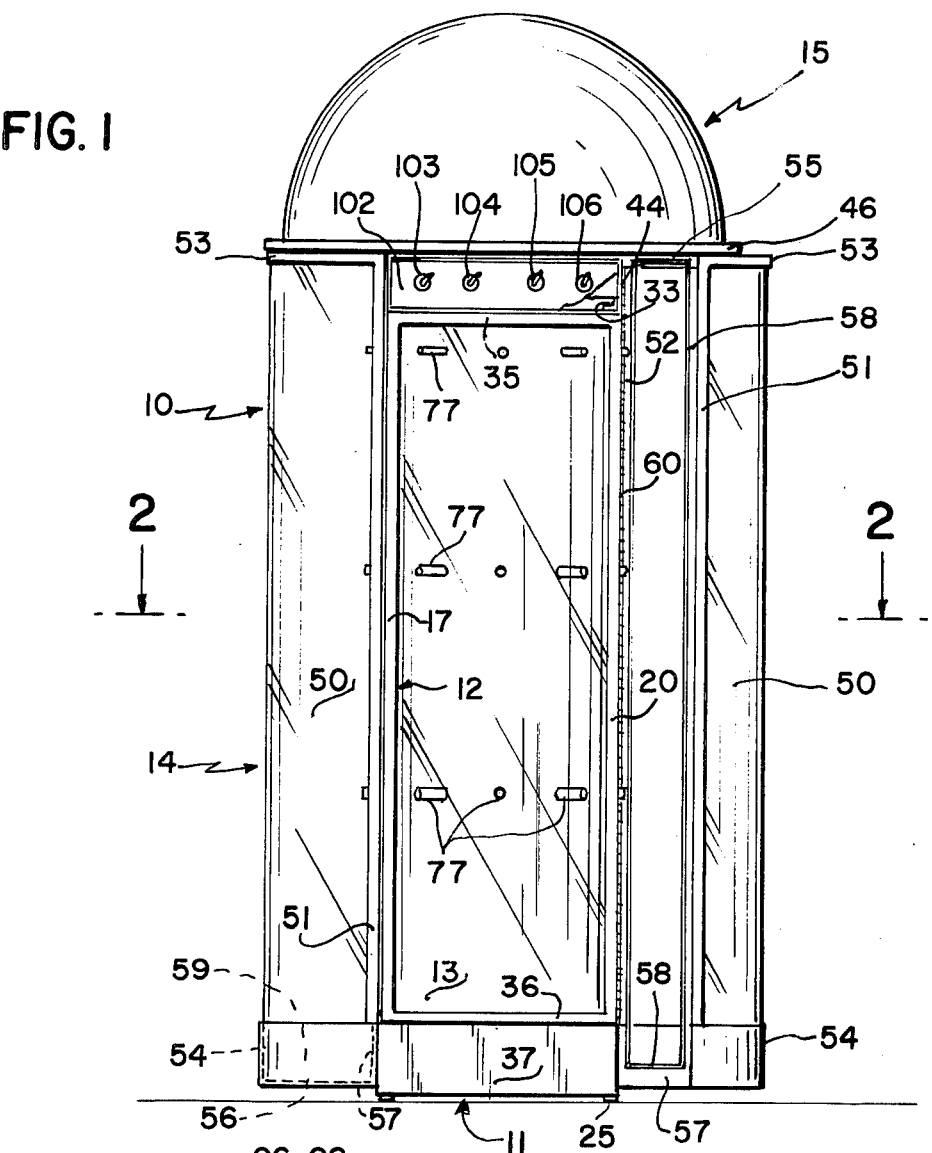
FIG. 1 is a front elevational view of the preferred embodiment of the invention, showing one of the doors in partly open condition.

FIG. is a fragmentary, greatly enlarged vertical sectional view, taken along the transverse axis through the most lateral portion of the base of the embodiment of FIG. 1.

Figure 4:
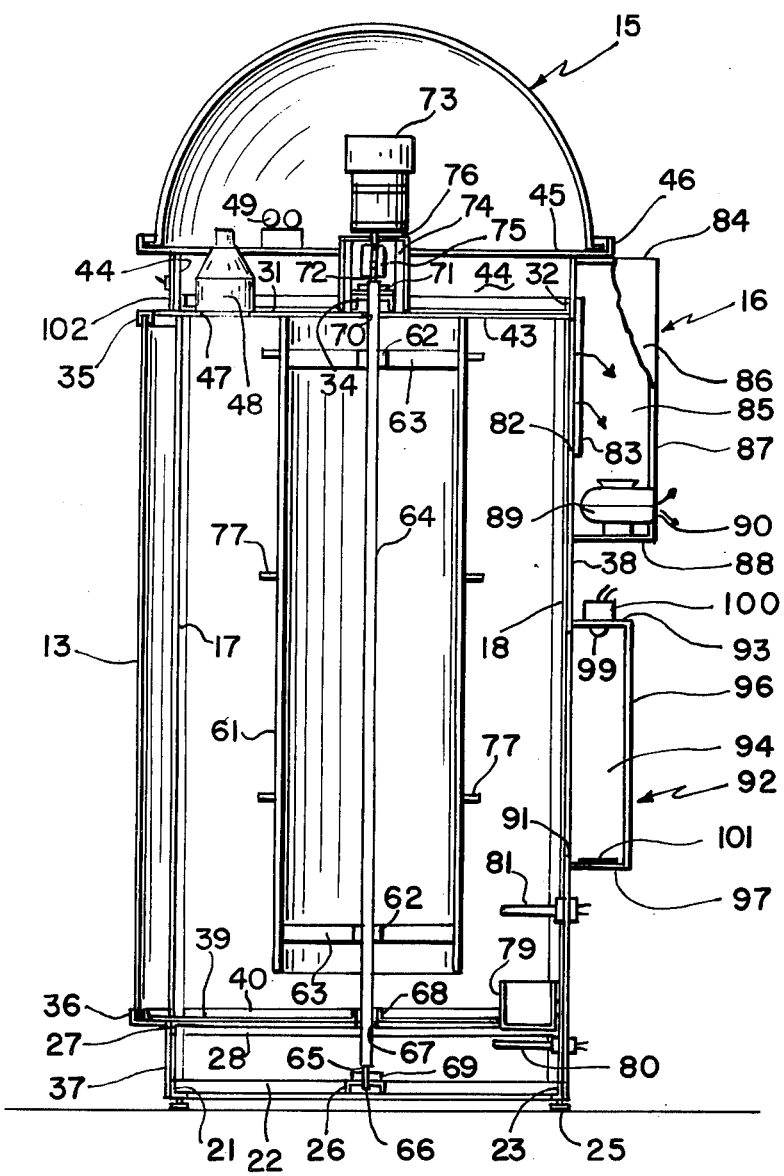

FIG. 4 is a vertical section view taken along the approximate medial, longitudinal axis of the case.

Figure 5:
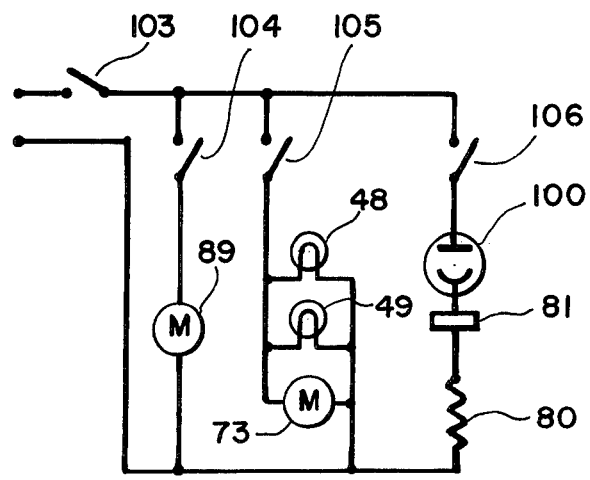

FIG. 5 is a schematic diagram of the electrical components used in the subject invention.

DESCRIPTION OF PREFERRED EMBODIMENTS

Referring now to the drawings, wherein like reference characters designate like or corresponding parts throughout the several views, there is shown in FIGS. 1—4 of the drawings a preferred embodiment of meat smoking and merchandise display case 10 of the subject invention which comprises, in general, base 11, frame 12, front panel 13 of transparent material, a plurality of transparent doors 14 hingedly mounted on selected portions of said case, shaped canopy 15, and a housing 16 (see FIG. 4) mounted on the rear of said case.

Figure 3:
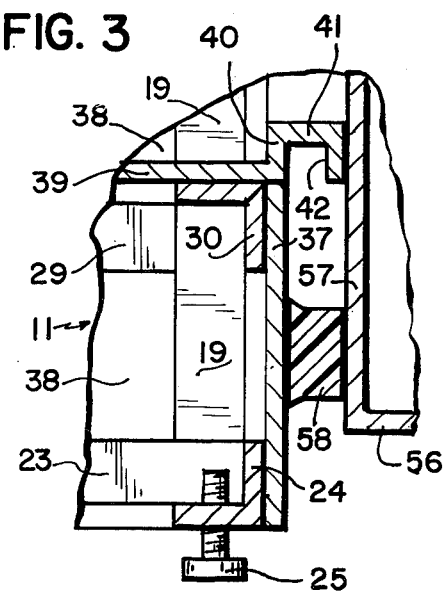

Frame 12 comprises vertically extending members 17-20 of desired height and preferably of angular stock, said members open inwardly and are secured downwardly to base 11; as best seen in FIGS. 3 and 4, base 11 terminates downwardly in a generally rectangular frame comprising horizontally extending members 21-24, preferably of angular stock which open upwardly and inwardly. The legs of vertical frame members 17-20 are aligned with and butt welded to each corner of the frame comprising members 21-24. If desired, leveling screws 25 or casters may conventionally be applied to selected portions of said base 11. A transversely extending and downwardly opening channel 26 is fixedly secured to the approximate center of opposing members 22, 24. Horizontally extending members 27-30, secured intermediate the respective adjacent vertically extending members, parallel members 21-24, respectively, and spaced a desired distance vertically thereabove; members 27-30 are preferably of angular stock, opening downwardly and inwardly with the downwardly depending leg of each of said members 27-30 aligned with and butt welded to the adjacent vertical frame members.

Frame members 17-20 terminate upwardly in the same horizontal plane; frame members 31-33 of angular stock are formed into a horizontally extending, U-shaped frame which opens forwardly and each of said members open upwardly and inwardly. A transversely extending and downwardly opening channel 34 is fixedly secured to the approximate center of opposing members 31, 33. Vertical frame members 17, 20 are aligned with and butt welded to the foremost edges of members 31, 33 respectively while frame members 18, 19 are aligned with and butt welded to the rearmost corners of the frame comprising the said members 31-33.

Front panel 13 of heat-resistant glass or plastic composition is arcuate in horizontal section and secured laterally to the foremost, transversely aligned legs of vertical frame members 17, 20; panel 13 is secured upwardly to frame member 35 which lies in a plane parallel to and slightly below the horizontal plane of members 31-33; downwardly said front panel is secured to arcuate frame member 36 which lies in a plane parallel to and slightly above the horizontal plane of members 27-30. A vertically extending skirt 37 of metallic composition is secured to at least the front and opposing sides of base 11 intermediate members 21, 22 and 24 and members 27, 28 and 30, respectively.

Vertically extending rear panel 38 of metallic composition is secured upwardly to member 32, laterally to the rear surface of the transversely aligned legs of frame members 18, 19 and downwardly to the transversely extending leg of frame member 23. Horizontally extending base plate 39, of metallic composition, at least partially overlies the horizontally extending legs of members 27-30 and is selectively secured thereto. Rearwardly, base plate 39 overlies member 29 and is secured to rear panel 38 in a liquid-tight joint. As viewed in FIG. 3 of the drawings, intermediate the vertical frame members 17-18 and 19-20, vertically extending flange 40 of said base plate lies in the approximate vertical plane of skirt 37; the drip guard thus formed further includes horizontally and outwardly extending flange 41 and downwardly depending flange 42. That portion of base plate 39 which extends forwardly of vertical frame members 17, 20 is generally arcuate in plan and the foremost edge thereof is secured to frame member 36 of front panel 13 in a liquid-tight joint.

Horizontally extending top plate 43 of metallic composition terminates laterally in the approximate plane of the outermost surface of the vertically extending legs of members 31, 33 and is secured thereto. Top plate 43 is secured rearwardly to member 32 and rear panel 38; forwardly of vertical frame members 17, 20 said plate is generally arcuate in plan with the foremost edge therof secured to frame member 35 in a liquid-tight joint. An essentially rectangularly-shaped and vertically extending skirt 44 of metallic composition and desired height is adapted to pass outwardly of the vertically extending legs of frame members 31–33 and secured thereto. Disc 45, terminating circumferentially in upturned flange 46, is fixedly secured to the upper edges of skirt 44. Canopy 15 of desired shape and preferably of translucent material, is supported on disc 45. A plurality of openings 47 in top plate 43, in any desired pattern or arrangement, accommodate downwardly directed display lights 48. Additionally, one or more electic lights 49 are conventionally mounted on disc 45 or other supporting structure and directed upwardly to illuminate canopy 15.

Each door 14 consists of a panel 50 of transparent, heat-resistant composition, arcuate in horizontal section and conforming to the curvature of panel 13. Panel 50 is supported laterally by vertically extending frame members 51–52, upwardly to horizontally extending frame member 53 which is adapted to pass beneath the lower surface of disc 45, and downwardly to frame member 54. As best seen in FIG. 1, frame member 53 is of uniform thickness and essentially semi-circular in plan, terminating inwardly in vertically extending flat 55 which in closed condition of said door is slightly spaced from and parallel to skirt 44 on the upper side of the case. Panel 50 is conventionally secured to the arcuate outer edge of frame member 53 preferably in a liquid-tight joint.

Frame member 54 of metallic composition and conforming to the curvature of panel 50 terminates downwardly in an integrally formed, horizontally extending and semi-circularly shaped base 56 which is at least slightly above the floor level; vertically extending inner wall 57 is secured downwardly to said base and laterally to the vertical edges of frame member 54 and in closed condition wall 57 bears against flange 42 and is slightly spaced from and parallels skirt 37 on the side of base 11. Gasket 58, preferably of a composition having magnetic properties, is secured to selected portions on the innermost surfaces of frame members 51–52, flat 55 and wall 57 to maintain said door in sealed, smoke-tight condition. It is understood that an upwardly opening, hollow container 59 is formed on the lower, inner portion of each door bounded by frame members 54, base 56 and wall 57 to accommodate chips of hickory or other woods utilized during the processing of the meat and other food products. Piano hinge 60 is secured to frame member 52 of the door and either the most lateral portion of rear panel 38 or the transversely extending, rearmost surface of frame member 18. It is further understood that the opposing door is hingedly mounted on the opposite side of the case in like manner.

Figure 2:
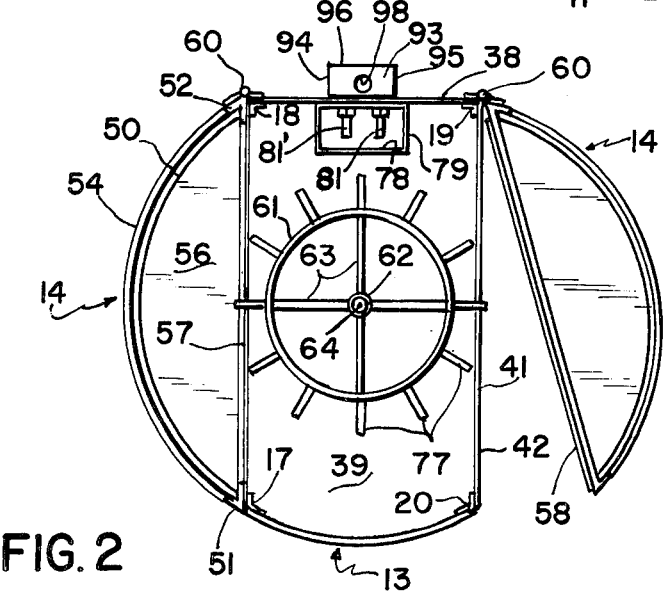
FIG. 2 is a horizontal sectional view, taken on the line 2—2 of FIG. 1, looking in the direction of the arrows.

Referring now to FIGS. 2 and 4 of the drawings, a vertically extending cylinder 61 of metallic or other heat-resistant composition is rotatably mounted within the case thus formed; specifically, an axially extending collar 62 is carried at least in proximity to each end of said cylinder by means of radially extending supports 63 radiating therefrom which are secured outwardly to the inner surface of said cylinder. An elongated shaft 64, greater in length than the height of said cylinder, is fixedly secured in each collar 62. Downwardly, shaft 64 includes shoulder 65 and section 66 of reduced diameter. Bore 67 in the approximate center of base plate 39, preferably including collar 68 concentric therewith, accommodates shaft 64; section 66 is journaled in the race of thrust bearing 69 carried on channel 26 and thence through a vertically aligned bore (not shown) in said channel. The upper end of shaft 64 is passed through bore 70 in the approximate center of top plate 43, through an aligned bore (not shown) in channel 34, and journaled in bearing 71 carried on said channel. Shaft 64 terminates upwardly in section 72 of reduced diameter. Gear motor 73 is secured to channel 34 by means of mounting bracket 74. Coupler 75 such as is well known in the art connects to section 72 of said shaft and shaft 76 of said gear motor.

A plurality of radially extending rods 77 of desired length, in any pattern or arrangement, are fixedly secured to the outer surface of cylinder 61 to support meat or other food products thereon. Furthermore, an annular gutter may be secured in proximity to the lower end of cylinder 61 to catch the drippings from the meat during processing.

An essentially rectangular opening 78 is provided in the rearmost, medial portion of base plate 39 and burn box 79 of heat-resistant, metallic composition fixedly secured therein. Heating element 80 is secured to rear panel 38 downwardly of burn box 79 and upon energization causes the wood chips carried therein to smoulder and emit smoke which is used to process the foods. Thermoswitch 81, secured to panel 38 at least slightly above the burn box, cuts off heating element 80 when a desired, predetermined temperature of approximately 50° Centigrade is detected. An additional thermoswitch 81' is desirably placed adjacent thermoswitch 81 to cut off all electrical power if a fire should occur within the case.

Opening 82 of desired shape is provided in the upper portion of rear panel 38 with a filter 83 detachably secured thereover. Housing 16, heretofore mentioned, includes top 84, opposing sides 85–86, back 87 and bottom 88, said housing is secured in a selected portion on the upper rear of said casing with top 84 slightly below the plane of disc 45. Blower 89 is conventionally mounted in housing 16 in proximity to bottom 88 and when activated draws smoke out of the case, through filter 83, and thence through opening 90 in back 87. If desired, a flue or other conduit may be secured about opening 90 to exhaust the smoke to a remote location.

An elongated, essentially rectangular opening 91 is provided in the approximate center of rear panel 38. Smoke chamber 92 comprising top 93, opposing sides 94–95, back 96 and bottom 97 is conventionally secured to said rear panel and communicates with the interior of the case through opening 91. Bore 98 in top 93 accommodates lens 99 of a conventional photocell 100 while the coacting mirror 101 is secured on the upper surface of bottom 97. The smoke chamber and accompanying apparatus is used to determine the density of smoke within the case so that the food products undergoing processing are not obscured and said food products may be visually inspected at all times. Specifically, if the smoke within chamber 92 exceeds such a predetermined, desired density the heating element 80 is deactivated until such time that the smoke within said case is exhausted by means of blower 89 or otherwise falls within an acceptable range.

Control panel 102 is mounted vertically above panel 13 and forwardly of skirt 44; said control panel has mounted thereon electrical switches 103-106. As illustrated in FIG. 5, a 110 volt, alternating current is applied to case 10 through master switch 103. Switch 104 is connected to blower 89; switch 105 activates lights 48, 49 and gear motor 73; and switch 106 is in a circuit including heating element 80, thermoswitch 81 and photocell 100. As heretofore mentioned, if the temperature from the burn box exceeds a selected, predetermined temperature, as indicated by thermoswitch 81, or the density of the smoke within the case exceeds a predetermined density, as indicated by photocell 100 and coacting mirror 101 in chamber 92, heating element 80 is deactivated until such time that such abnormal conditions are corrected. The several electrically operated components within case 10 may obviously be electrically connected in any conventional manner whereby said components may be activated separately or any desired combination of such components activated by a selected switch.

In use, meat or other food products are secured on rods 77 and the doors 14 closed. Upon closing master switch 103 the several electrical components may be selectively energized. For example, switch 105 permits energization of display lights 48, light 49 which illuminates canopy 15, and gear motor 73 which drives cylinder 61. Heating element 80 is energized by means of switch 106 and thereafter controlled by thermoswitch 81 and smoke chamber 92 in the manner heretofore described in detail. After completion of the smoking process, heating element 80 is deactivated and, if required, blower 89 activated by means of switch 104 to remove smoke from within the case. The food products may be retained in the case for storage and display purposes, or removed.

In a modification of such invention, rear panel 38 is secured laterally to the foremost surfaces of the transversely aligned legs of vertical frame members 18-19, upwardly to member 32 and downwardly to frame member 29. Additionally, an auxiliary housing (not shown) may be detachably secured to rear panel 38 downwardly of housing 16 to cover the several components on the lower, rear portion of the case.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

What is claimed is:

1. A meat smoking and merchandise display case adapted to treat food products by smoke producing means comprising
    a base,
    an outer casing mounted on said base,
    at least a portion of said outer casing of transparent material,
    said case terminating upwardly in a shaped canopy,
    an elongated, vertically extending inner casing rotatably mounted in said outer casing,
    means to rotate said inner casing,
    food product support means on said inner casing,
    said smoke producing means in proximity to said base intermediate said outer and inner casings,
    heating means adapted to activate said smoke producing means,
    temperature control means adapted to regulate said heating means,
    smoke control means adapted to detect the smoke density and to regulate said heating means when the smoke from said smoke producing means exceeds a predetermined density, and
    means responsive to said smoke control means to selectively exhaust the smoke from said case.

2. The invention of claim 1 further including means to at least partially illuminate said inner casing.

3. The invention of claim 2 further including means to at least partially illuminate said canopy.

4. The invention of claim 1 wherein said means to rotate said inner casing is mounted under said canopy.

5. The invention of claim 1 further including filter means coacting with said means to selectively exhaust the smoke from said case.

6. The invention of claim 1 further including a plurality of doors of transparent material in said outer casing.

7. The invention of claim 1 wherein said outer casing includes a fixed panel of transparent material and at least one door laterally of each side of said fixed panel.

8. The invention of claim 1 further including an elongated, vertically extending shaft driven by said means to rotate said inner casing, and connecting means intermediate said shaft and said inner casing.

9. A meat smoking and merchandise display case adapted to treat food products by smoke producing means comprising
    a base,
    an outer casing at least partially secured to said base,
    said case terminating upwardly in a shaped canopy,
    a vertically extending cylinder rotatably mounted in said outer casing,
    means to rotate said cylinder,
    food product support means on said cylinder,
    said smoke producing means in a selected portion of said base intermediate said outer casing and said cylinder,
    heating means adapted to activate said smoke producing means,
    temperature control means adapted to regulate said heating means,
    smoke control means adapted to detect the smoke density and to regulate said heating means when the smoke from said smoke producing means exceeds a predetermined density,
    means responsive to said smoke control means to selectively exhaust the smoke from said case, and
    filter means adapted to coact with said means to selectively exhaust the smoke from said case.

* * * * *